US011787694B2

(12) United States Patent
Zhang et al.

(10) Patent No.: US 11,787,694 B2
(45) Date of Patent: Oct. 17, 2023

(54) PRODUCING HIGH PURITY HYDROGEN AND CARBON MONOXIDE FROM A HYDROCARBON MATERIAL

(71) Applicant: General Atomics, San Diego, CA (US)

(72) Inventors: Jiping Zhang, San Diego, CA (US); Jonathan David Sheeder, Escondido, CA (US); Robert Schleicher, Carlsbad, CA (US); Jonas Opperman, San Diego, CA (US)

(73) Assignee: General Atomics, San Diego, CA (US)

( * ) Notice: Subject to any disclaimer, the term of this patent is extended or adjusted under 35 U.S.C. 154(b) by 98 days.

(21) Appl. No.: 17/402,487

(22) Filed: Aug. 13, 2021

(65) Prior Publication Data

US 2023/0047197 A1 Feb. 16, 2023

(51) Int. Cl.
*C01B 3/24* (2006.01)
*C01B 32/50* (2017.01)
(Continued)

(52) U.S. Cl.
CPC .............. *C01B 3/24* (2013.01); *B01J 19/248* (2013.01); *B01J 19/2445* (2013.01);
(Continued)

(58) Field of Classification Search
CPC ........... C01B 3/24; C01B 32/40; C01B 32/50; C01B 2203/0255; C01B 2203/0272; C01B 2203/1235; C01B 2203/148; C01B 2203/0838; C01B 2203/1241; C01B 2203/1247; C01B 2203/16; B01J 19/2445;
(Continued)

(56) References Cited

U.S. PATENT DOCUMENTS 3,128,164 A 4/1964 Moritz et al.
6,869,580 B2 3/2005 Wojtowicz et al.
(Continued)

FOREIGN PATENT DOCUMENTS

AU 2014204520 A1 2/2015

OTHER PUBLICATIONS

International Search Report and Written Opinion for PCT/US2022/040219, dated Nov. 24, 2022 (10 pages).

*Primary Examiner* — Steven J Bos
*Assistant Examiner* — Syed T Iqbal

(57) ABSTRACT

Disclosed are apparatuses, systems, methods, and devices for generating hydrogen pyrolysis of hydrocarbons (methane, diesel, JP8, etc.) in a reactor. The reactor includes multiple channels in parallel. A hydrocarbon flows in a channel and decomposes into hydrogen and carbon. Hydrogen gas flows out and some of the carbon will deposit on the channel wall. Once carbon deposition reaches a predetermined level, the hydrocarbon flow stops, and air or oxygen is caused to flow into the channels to oxidize carbon into carbon monoxide or carbon dioxide and supply heat to neighboring channels. Simultaneously, the hydrocarbon will flow into neighboring channels causing decomposition into hydrogen and carbon in the neighboring channels. When the carbon coating in the neighboring channels reaches a predetermined level, the gas flow is switched again to air or oxygen. In this way, each channel alternates between decomposing the hydrocarbon and oxidizing the deposited carbon.

12 Claims, 11 Drawing Sheets

(51) Int. Cl.
    *C01B 32/40*         (2017.01)
    *B01J 19/24*         (2006.01)

(52) U.S. Cl.
    CPC .............. *C01B 32/40* (2017.08); *C01B 32/50* (2017.08); *B01J 2219/00051* (2013.01); *B01J 2219/00164* (2013.01); *B01J 2219/0218* (2013.01); *C01B 2203/0255* (2013.01); *C01B 2203/0272* (2013.01); *C01B 2203/1235* (2013.01); *C01B 2203/148* (2013.01)

(58) Field of Classification Search
    CPC ............ B01J 19/248; B01J 2219/00051; B01J 2219/00164; B01J 2219/0218; Y02E 60/36; Y02E 60/50
    See application file for complete search history.

(56) References Cited

U.S. PATENT DOCUMENTS

| | | | |
|---|---|---|---|
| 2002/0041986 A1* | 4/2002 | Wojtowicz | C10J 3/62 |
| | | | 423/437.2 |
| 2005/0003247 A1 | 1/2005 | Pham | |
| 2014/0206779 A1* | 7/2014 | Lackner | C01B 3/26 |
| | | | 518/703 |

* cited by examiner

US 11,787,694 B2

PRODUCING HIGH PURITY HYDROGEN AND CARBON MONOXIDE FROM A HYDROCARBON MATERIAL

TECHNICAL FIELD

This patent document relates to the generation of hydrogen gas and/or carbon monoxide gas for various applications.

BACKGROUND

Hydrogen is a valuable material for a wide range of applications in different industries, including, for example, a raw material in a wide range of material productions such as ammonia, fertilizers, methanol, polymers, foods, a reduction agent in the metallurgic industry, an additive for processing in oil refineries, and an increasingly important material for producing fuels and energy production such as fuel cell electric power systems which combine hydrogen and oxygen to produce electricity.

SUMMARY

Hydrogen production can be achieved in various ways. For example, hydrogen can be generated via electrolysis or reformation of fossil fuels. Various implementations of electrolysis tend to use a great amount of energy and may be feasible in locations tied to the electrical grid with an inexpensive source of electricity. Reformation of methane, natural gas, or JP8 requires a complex system in which sulfur and other impurities must be removed before usable hydrogen can be generated. This aspect of these production systems adds complexity and cost to the production. In addition, various hydrogen gas production systems based on electrolysis and reformation require compression of the hydrogen for storage and this requirement can limit the applications of such production systems. New methods of generating pure hydrogen as well as other gases such as carbon monoxide are desirable.

This patent document discloses devices, systems, and methods for generating gases including hydrogen and carbon monoxide from a hydrocarbon and oxygen.

In one aspect, a method for generating hydrogen is disclosed. The method includes passing a material including one or more hydrocarbon structures through a first conduit that is heated above a desired threshold temperature to cause decomposition of the material into a first mixture that includes a first hydrogen gas and first carbon deposited onto a wall of the conduit. The method further includes extracting the first hydrogen gas from the first conduit as part of a hydrogen gas output. After stopping the passing the material through the first conduit, oxidation of the first carbon deposited on the wall of the first conduit is caused to convert the first carbon into a first carbon oxide gas while generating heat. The heat generated from the first conduit is coupled to a second conduit separate from the first conduit. After stopping the passing the material through the first conduit, the material including one or more hydrocarbon structures is passed through the second conduit that is heated above the desired threshold temperature by receiving the heat generated from the first conduit to cause decomposition of the material into a second mixture that includes a second hydrogen gas and second carbon deposited onto a wall of the second conduit. The second hydrogen gas is extracted from the second conduit as part of the hydrogen gas output. After stopping the passing the material through the second conduit, oxidation of the carbon deposited on the wall of the second conduit is caused to convert the second carbon into a second carbon oxide gas while generating heat. The foregoing operations are repeated to recycle energy between the first and second conduits to alternatively to extracting the first hydrogen gas from the first conduit and the second hydrogen gas from the second conduit sequentially in time to produce the hydrogen gas output.

In another aspect, an apparatus for generating hydrogen gas is disclosed. The apparatus incudes a chamber structured to include a hollow interior, a silicon carbide interior wall and exterior wall with silicon between the interior wall and the exterior wall. The apparatus also includes a fluid supply system coupled to the chamber to controllably supply selected fluids including gases and/or liquids into the chamber, including a first fluid which can be decomposed into hydrogen and carbon and a first gas containing oxygen that reacts with carbon to release heat and generate a second gas. The apparatus further includes a control system coupled to the fluid supply system to sequentially control supplying of the fluids into the chamber, wherein control system controls the fluid supply system to cause the first fluid to pass through the chamber thereby causing decomposition of the first fluid into a generated hydrogen gas and carbon which is deposited onto the interior wall of the chamber, and to stop supplying of the first fluid and after stopping the first fluid, the gas supply system causes the first gas to pass through the chamber to cause the carbon to react with oxygen in the first gas thereby releasing heat to heat the chamber and the second gas.

The above and other aspects and their implementations are described in greater detail in the drawings, the description and the claims.

DETAILED DESCRIPTION

Figure 1:
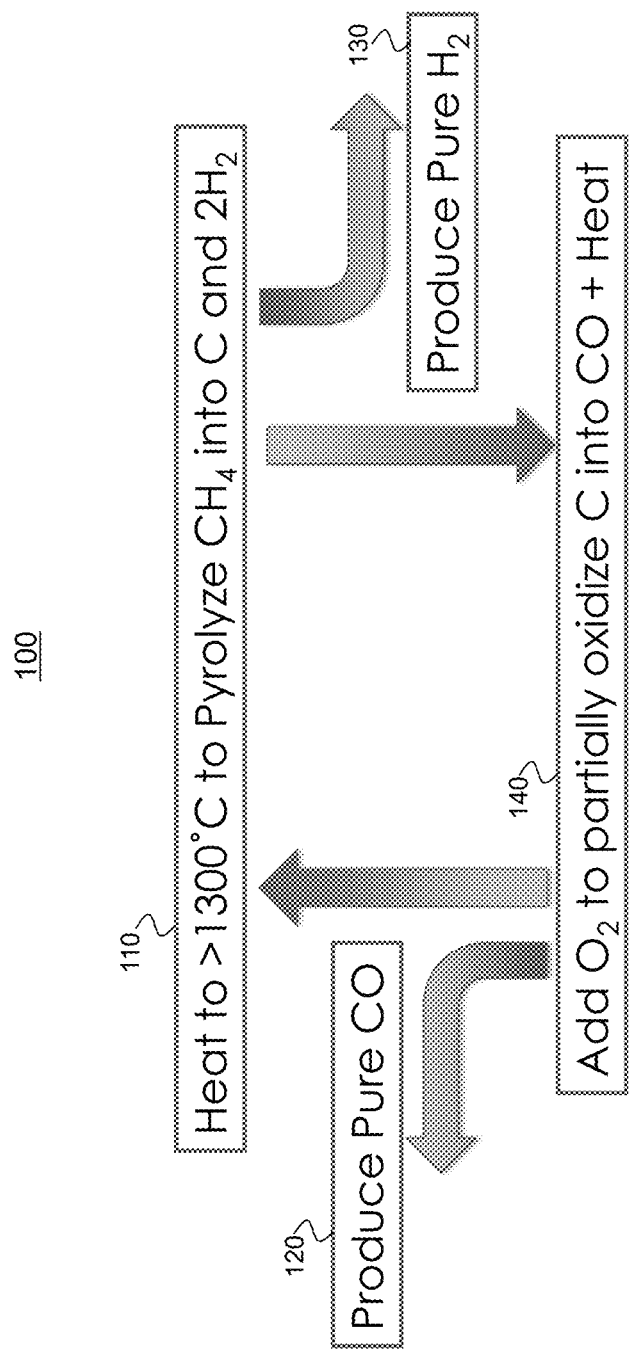
FIG. 1 depicts a process for producing hydrogen gas and carbon monoxide gas in a reactor, in accordance with some example embodiments.

The disclosed subject matter includes designs of a channel reactor and methods of producing hydrogen from pyrolysis of hydrocarbons (methane, diesel, JP8, etc.). In implementations, the structure of the reactor can include multiple channels in parallel and may have every other channel connected at both ends. Such a reactor may be initially heated to a high temperature (e.g., >1400° C.). A hydrocarbon gas can be directed to flow in a channel and can be decomposed into hydrogen and carbon within the channel. The hydrogen gas from this decomposition can be extracted out of the channel and be collected and some of the carbon from this decomposition will deposit on the inner wall of the channel. Once carbon deposition on the inner wall of the channel reaches a predetermined level, the hydrocarbon flow stops. To continue the hydrogen production, the flow of hydrogen gas is terminated and is replaced by directing a flow air or oxygen into the channel to oxidize deposited carbon on the inner wall into carbon monoxide or carbon dioxide while generating heat which is supplied to neighboring channels. Simultaneously, the hydrocarbon gas will be directed to flow into neighboring channels causing hydrocarbon decomposition into hydrogen and carbon in the neighboring channels to produce hydrogen gas and carbon. When the carbon coating on the inner walls in the neighboring channels reaches a predetermined level, the gas flow in those channels is switched again to air or oxygen. In this way, each channel alternates between decomposing the hydrocarbon and oxidizing the deposited carbon. In some example embodiments, at any one time every other channel is decomposing the hydrocarbon and the alternate channels are oxidizing the deposited carbon. The foregoing process is thus a repeatable process cycle to produce hydrogen and carbon monoxide or carbon dioxide. One of the benefits of the process is that hydrogen is produced continuously without needing to switch gases.

Since the reaction is exothermic, the generated heat as a byproduct of such reaction may be beneficially used or recycled within the hydrogen production system or may be used to supply heat to another system. For example, the generated heat may be used to burn feedstock hydrocarbons or hydrogen that is produced in the channels.

The disclosed technology can be used generate $H_2$ and CO for distribution on demand, a desirable feature for various applications. For example, the disclosed technology can be used to produce hydrogen for use in a vehicle.

Hydrocarbons such as methane, diesel, and JP8 can be fully converted into pure $H_2$ and carbon (e.g., more than 99.5%) at a temperature greater than 1400 C with a resident time of less than 0.1 seconds without a catalyst. The CO production can be controlled to have a very high purity of the produced CO (e.g., a purity more than 99%) by controlling $O_2$ flow.

Methane can be decomposed into C and $H_2$ while releasing 75 kJ of heat (endothermic) according to the following chemical reaction:

$$CH_4 = C + 2H_2 + 75 \text{ kJ} \qquad \text{Equation 1.}$$

As described above, deposited carbon reacts with $O_2$ to produce CO and heat (exothermic) according to:

$$C + \tfrac{1}{2}O_2 = CO - 110 \text{ kJ} \qquad \text{Equation 2.}$$

In addition, deposited carbon reacts with $O_2$ to produce $CO_2$ and heat (exothermic) according to:

$$C + O_2 = CO_2 - 390 \text{ kJ} \qquad \text{Equation 3.}$$

Heat alone can be sufficient for methane or other hydrocarbons (HCs) to undergo pyrolysis with either partial oxidation of carbon as expressed in Equation 2, or full oxidation of carbon as expressed in Equation 3. Equations 1-3 do not produce water, so heating efficiency is relatively high.

To produce CO, the partial oxidation of carbon in the chemical reaction in Equation 2 may be used. Alternatively, oxygen-containing air may be used to fully oxidize carbon in the oxidation process in Equation 3 which releases more heat that the partial oxidation in the process in Equation 2.

In some implementations, heat exchanger (HX) may be used to improve efficiency by recovering heat from outlet gases.

If other hydrocarbons are used, more CO may be produced and more heat will be generated according to:

$$C_xH_{2y} = xC + yH_2 + xQ(y<=2x, \text{ and } Q<=75 \text{ kJ}) \qquad \text{Equation 4.}$$

FIG. 1 depicts a process 100 for producing hydrogen gas and carbon monoxide gas in a reactor, in accordance with some example embodiments. At 110, the reactor containing methane may be heated to a high temperature (e.g., around or higher than 1300° C.) to pyrolyze $CH_4$ into C and $H_2$ according to Equation 1. Besides methane, other hydrocarbons can also be used. Hydrogen gas 130 flows out and some of the carbon is deposited on the channel wall. Once carbon deposition reaches a predetermined level, the hydrocarbon flow is turned off, and $O_2$ gas is turned on. At 140 oxygen flows into the channels to oxidize carbon into carbon monoxide 120 and supplies heat to neighboring channels. In some embodiments, no gas separation is required, and no catalyst or water is required. The foregoing reaction is self-heating and this no external heating is needed after the reaction has started.

Figure 2A:
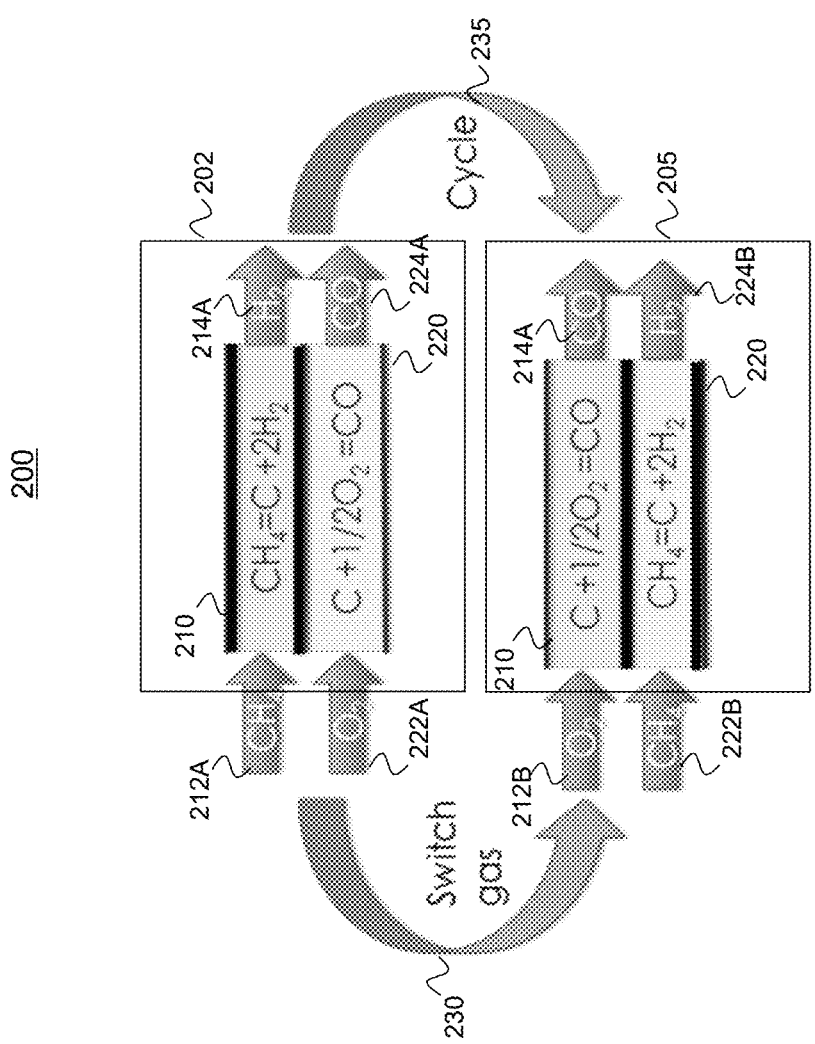
FIG. 2A depicts a diagram showing two channel reactors that alternate over time in input hydrocarbon and output gas, in accordance with some example embodiments.

FIG. 2A depicts a diagram 200 showing two channel reactors 210 and 220 that alternate over time in two modes of operation for receiving input hydrocarbon and outputting hydrogen gas and for receiving oxygen or air and outputting CO, in accordance with some example embodiments.

At first alternate times, reactor 210 is configured to receive an input hydrocarbon 212A such as methane ($CH_4$) shown and produce $H_2$ gas 214A via decomposition according to Equation 1. Also, at a first alternate times reactor 220 is configured to receive an input of $O_2$ 222A which reacts with carbon deposited on the walls of reactor 220 to produce CO gas 224A via partial oxidation according to Equation 2.

At second alternate times, reactor 210 is configured to receive an input of $O_2$ 212B which reacts with carbon deposited on the walls of reactor 220 to produce CO gas 214B via partial oxidation according to Equation 2. Also, at a second alternate times reactor 220 is configured to receive an input hydrocarbon 222B such as methane ($CH_4$) shown and produce $H_2$ gas 224B via decomposition according to Equation 1.

First and second alternate times may be interleaved in the sense that a first alternate time is followed by a second alternate time, which in turn is followed by another first alternate time. In this way, each channel reactor is repetitively alternated between receiving a hydrocarbon and producing $H_2$ gas, and receiving $O_2$ and producing CO gas.

Adjacent channels such as channels 210 and 220 shown in FIG. 2A have shared wall 215 between them. Another channel (not shown in FIG. 2A) on the other side of channel 210 has a shared wall between the other channel and the other side of channel 210. Similarly, channel 220 shares its other wall with another channel. The reaction in channels producing CO form an O2 input gas is exothermic according to Equation 2 which acts to heat the shared walls with the adjacent channels that are decomposing the hydrocarbon according to Equation 1 which is endothermic thereby requiring heat. In this way, the channels performing oxidation according to Equation 2 provide the necessary heat to the channels performing decomposition.

In some implementations, the channels may be made from silicon carbide (SiC) which is compatible with high operating temperature and as well as being chemically compatible. For example, carbon will build-up on the walls of a SiC channel during decomposition in the pyrolysis phase that will react with $O_2$ during the oxidation phase. Some example embodiments include silicon encapsulated by SiC. For example, the channel wall material may be SiC on exposed surfaces with Si inside the SiC. An advantage of Si encapsulation is that Si has a high latent heat (~1800 kJ/kg) and high thermal conductivity which aids in keeping the channel walls at a constant and uniform temperature even with an unstable flow.

Figure 2B:
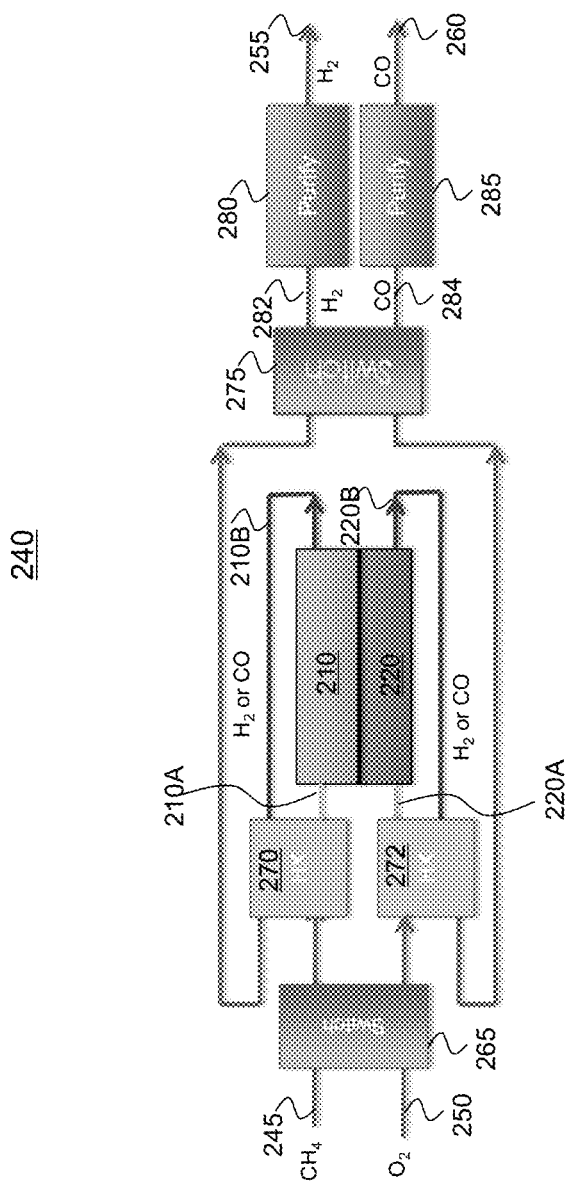
FIG. 2B depicts an example of a piping and interconnection diagram for a two-channel reactor system, in accordance with some example embodiments.

FIG. 2B depicts an example of a piping and interconnection diagram for a two-channel reactor system 240, in accordance with some example embodiments. Inputs of a hydrocarbon (methane shown) and oxygen pass through a double pole single throw (or double throw) switch 265 allowing the hydrocarbon to be directed to either channel reactor 210 or 220 where when one channel reactor has the hydrocarbon directed to its input and the other channel has oxygen directed its input. With switch 265 in a first setting, the two-channel reactor system is configured as 202 in FIG. 2A and in a second setting the two-channel reactor system is configured as 205. The outputs 247 and 252 may pass through a heat exchange (HX) device. For example, the output 247 passes though heat exchange device 270 and then to the input of reactor 210, and the output 252 passes though heat exchange device 272 and then to the input of reactor 220. The heat exchange devices are used to extract heat from the channel reactor outputs 210B and 220B which may be used to heat the channel reactor inputs 210A and 220A. Another switch, switch 275 similar to switch 265 is placed in line with the outputs of the reactors to switch each reactor's output to an H2 path 282 when each reactor is generating $H_2$ and a CO path 284 when each reactor is generating CO. The $H_2$ and CO output gases are purified by purifiers 280 and 285 to produce purified $H_2$ 255 and purified CO 260.

Figure 3A:
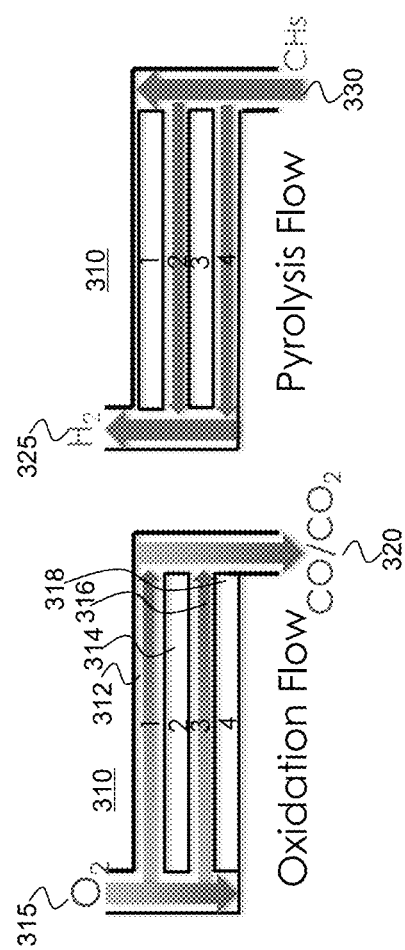
FIG. 3A depicts example flow diagrams for a four-layer multi-channel reactor, in accordance with some example embodiments.

FIG. 3A depicts example flow diagrams for a four-layer multi-channel reactor, in accordance with some example embodiments. The example reactor of FIG. 3A has four layers that are stacked. At any one time two layers are in an oxidation phase and two layers are in the pyrolysis phase with the four layers alternating as oxidation phase/pyrolysis phase. At a later time, the two layers that were in oxidation phase switch to the pyrolysis phase and the two layers that were in the pyrolysis phase switch to the oxidation phase.

FIG. 3A shows the phases of the layers at a particular time with layers 1 (312) and 3 (316) of reactor 310 being in the oxidation phase in accordance with Equations 2 or 3. Oxygen at 315 flows into layers 1 (312) and 3 (316) generating CO or $CO_2$ output gas at 320. At the same time, layers 2 (314) and 4 (318) are in the pyrolysis phase in accordance with Equation 1. A hydrocarbon (shown as $CH_s$) passes at 330 into layers 2 (314) and 4 (318) generating $H_2$ has at 325. At another time, layers 1 and 3 will be in the pyrolysis phase and layers 2 (314) and 4 (318) will be in the oxidation phase.

Figure 3B:
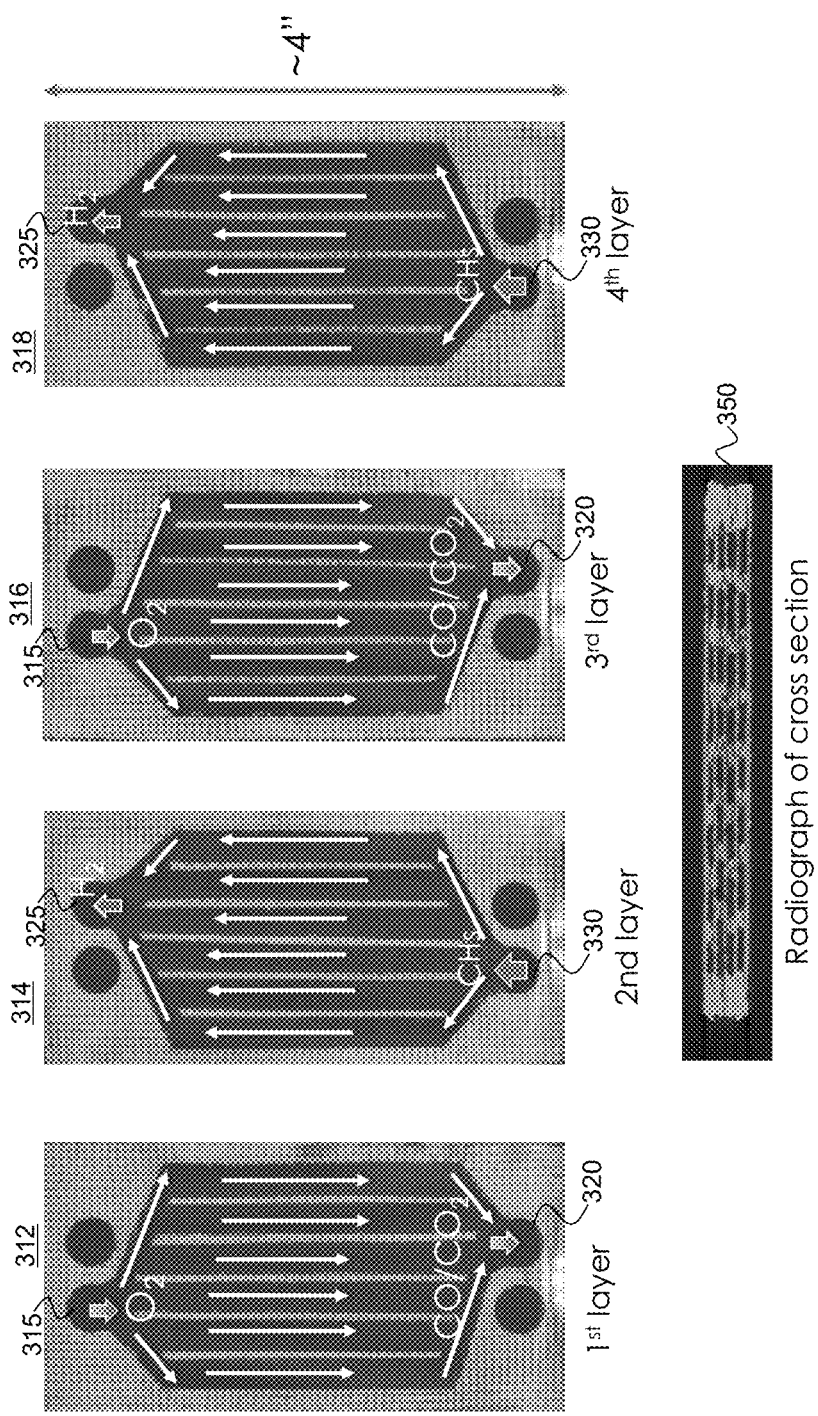
FIG. 3B depicts examples of images and flow for each of the four layers depicted in FIG. 3A.

FIG. 3B depicts examples of images and flow for each of the four layers 312-318 depicted in FIG. 3A. The first layer, layer 312 is in the oxidation phase with oxygen flowing in at 315 and CO or $CO_2$ flowing out at 320. Each of the layers 312-318 has multiple parallel channels as shown at 312 for the oxidation of carbon. The second layer, layer 314 is in the pyrolysis phase with the hydrocarbon flowing in at 330 and hydrogen flowing out at 325. The shared wall between layers 312 and 314 is parallel to the gas flow and parallel to the page. The walls between the channels (5 such walls at 312) can be thermodynamically connected to the shared wall thereby absorbing/radiating heat at each of the six smaller channels shown at each of 312-318. The third layer, layer 316 is in the oxidation phase with oxygen flowing in at 315 and CO or $CO_2$ flowing out at 320. The fourth layer, layer 318 is in the pyrolysis phase with the hydrocarbon flowing in at 330 and hydrogen flowing out at 325. The oxygen input 315 for layers 312 and 316 are connected together via openings at layers 312 and 316. The hydrocarbon input 330 for layers 314 and 318 are connected together via openings at layers 314 and 318. CO or $CO_2$ output for layers 312 and 316 are connected together via openings at layers 312 and 316. Hydrogen output for layers 314 and 318 are connected together via openings at layers 314 and 318. Although FIGS. 3A and 3B show four layers, the system can be scaled up to a larger number of layers as well. Switches such as those described with respect to FIGS. 2A and 2B can be included in the system described in FIGS. 3A and 3B so that over time channels in the oxidation phase can be switched to the pyrolysis phase and channels in the pyrolysis phase can be switched to the oxidation phase.

Shown in FIG. 3B at 350 is a radiograph of a cross section of the four-layered device.

Figure 4:
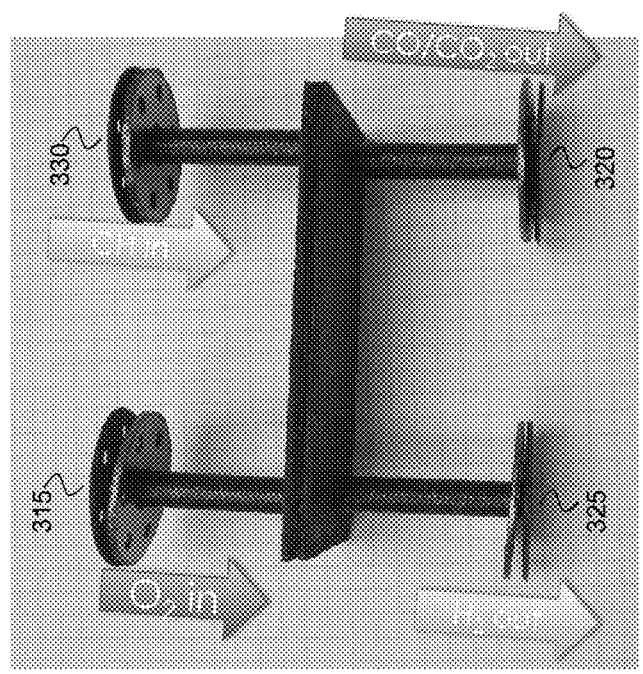
FIG. 4 depicts a joint free channel reactor that can operate at high temperatures, in accordance with some example embodiments.

FIG. 4 depicts a joint free channel reactor that can operate at high temperatures, in accordance with some example embodiments. The reactor in FIG. 4 is similar to the reactor in FIGS. 3A and 3B reoriented so that the inputs 315 and 330 are on one side and the outputs 325 and 320 on the opposite side. The reactor in FIG. 4 is made using silicon carbide (SiC) and can be made in one piece with no joints. Avoiding joints prevents structural failures due to thermal stresses caused by differing coefficients of thermal expansion (CTE) for different materials. SiC structures may be operated at temperatures up to 1500 C. SiC provides for efficient heat transfer. The four ports may connect to internal structures that are identical so that the ports are swappable. For example, the input ports shown in FIG. 4 can be swapped to output ports and the output ports swapped to input ports. The SiC structure is impermeable to almost all substances.

Figure 5:
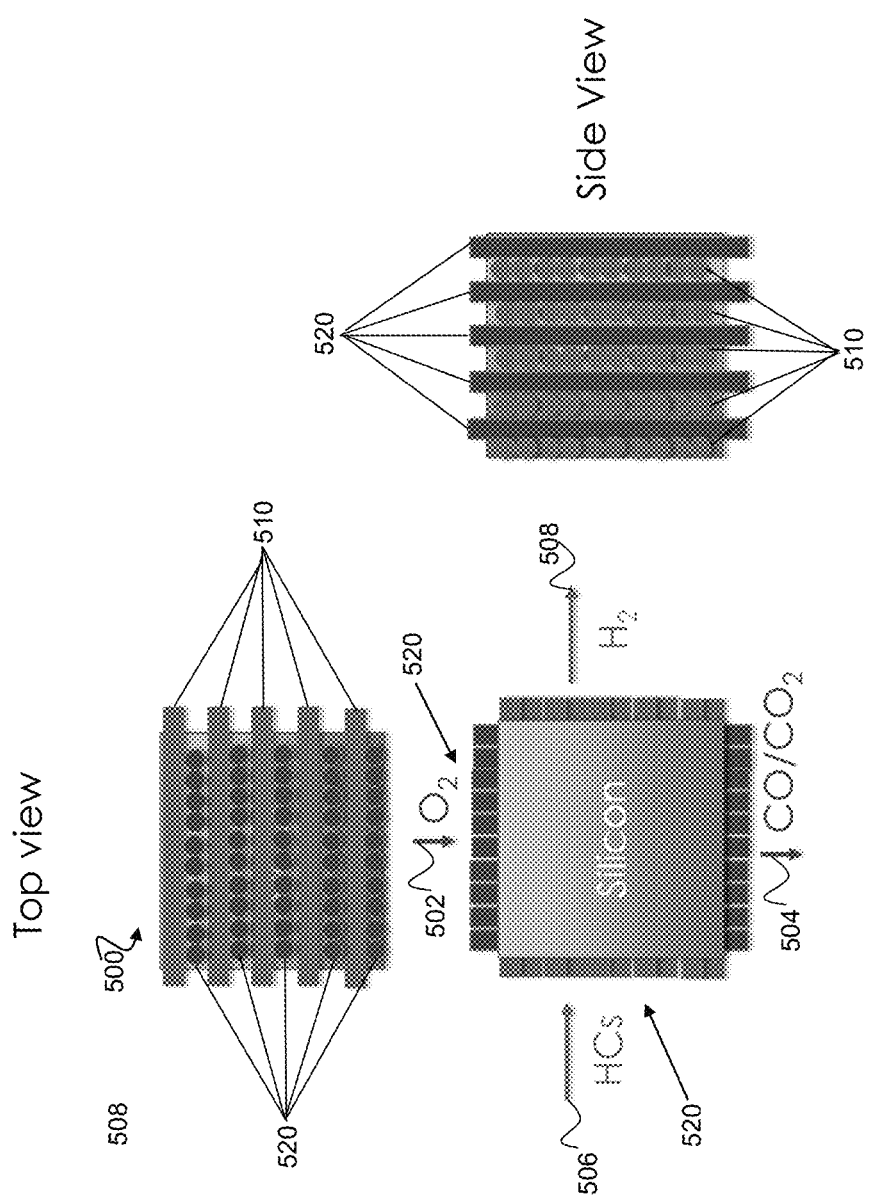
FIG. 5 depicts an example of a multi-channel cross-flow reactor, in accordance with some example embodiments.

FIG. 5 depicts an example of a multi-channel cross-flow reactor 500, in accordance with some example embodiments. In the example of FIG. 5, in a first flow direction oxygen flows in at 502 and CO or $CO_2$ flows out at 504, and in a second direction (e.g., perpendicular to the first direction) a hydrocarbon flows in at 506 and hydrogen flows out at 508. The cross-flow reactor may include multiple layers alternating between oxygen/CO or $CO_2$ and hydrocarbon/hydrogen as depicted in FIG. 5 at 510 and 520. Each layer may also include multiple channels as shown in FIG. 5 at 510 and 520.

The cross flow-channels provide more convenient access to input and output ports and for connection to heat exchange (HX) devices. The cross-flow reactor may be configured with the reactor tubes surrounded by Si. The Si acts as a heat transfer and heat storage media to keep reactor at a uniform and constant temperature such as 1414 C which corresponds to the melting point of Si.

Figure 6:
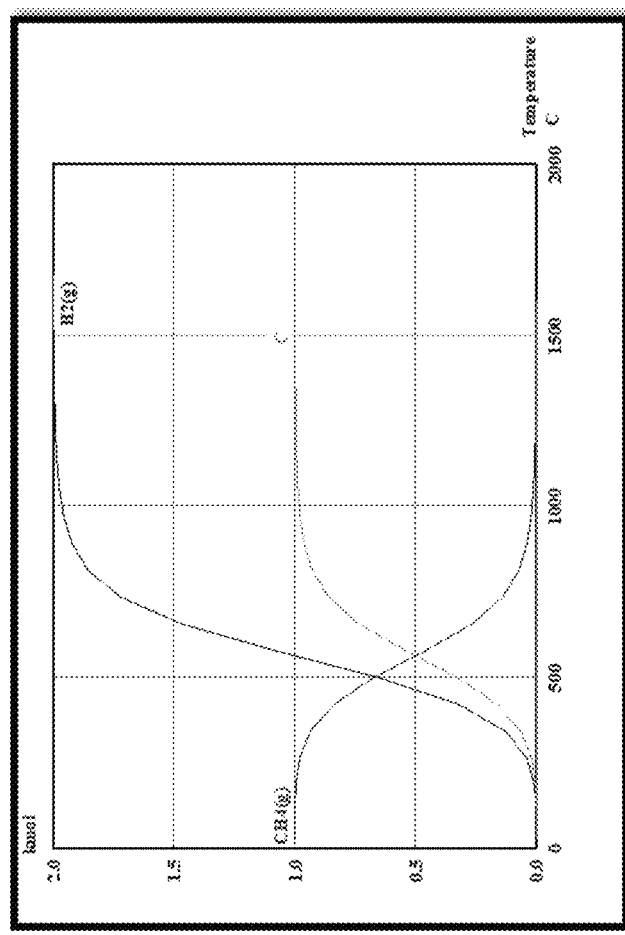
FIG. 6 depicts an example plot showing a thermodynamic equilibrium as a function of temperature.

FIG. 6 depicts an example plot showing the thermodynamic equilibrium of Equation 1 as a function of temperature. FIG. 6 shows an example of 1 kmol of methane at temperatures below about 200 C remains as methane and is not converted to carbon and hydrogen gas. As the temperature increases, the number of kilomoles (kmol) of methane decreases and the number of kmols of hydrogen and carbon increase. At about 1300 C and higher temperatures, methane is completely decomposed to hydrogen and carbon. Experimental results using a residual gas analyzer have confirmed the foregoing result that methane is completely decomposed into carbon and hydrogen at 1300 C and higher temperatures. Experimental results confirm that diesel and JP8 fuel also decomposed into hydrogen and carbon at temperatures of about 1200 C and above.

Figure 7:
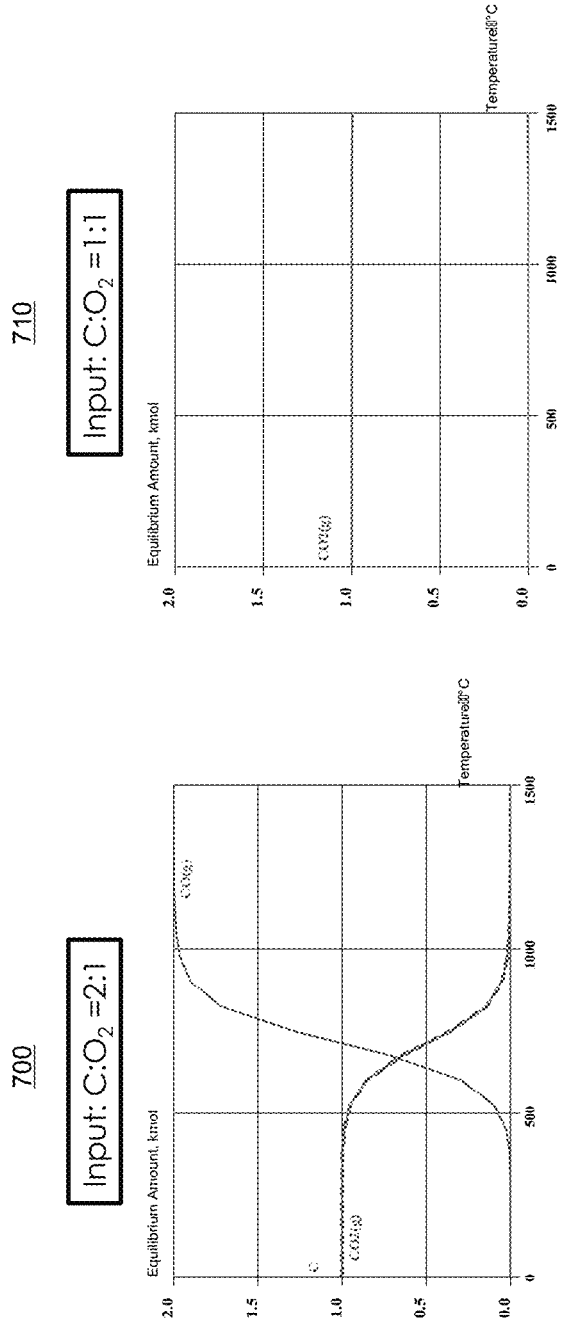
FIG. 7 depicts additional examples of plots showing a thermodynamic equilibrium as a function of temperature, in accordance with some example embodiments.

FIG. 7 depicts examples of plots showing the thermodynamic equilibrium of Equations 2 and 3 as a function of temperature, in accordance with some example embodiments. At 700 is a plot of the quantity in kmol of CO and $CO_2$ as a function of temperature with channel inputs of carbon and oxygen when the ratio of carbon to oxygen at the input is 2:1. The plot at 700 shows that with this 2:1 ratio of carbon:oxygen, the output is CO with almost no $CO_2$ being generated at temperatures above 1200 C. At 710 is a plot of the quantity in kmol of CO and $CO_2$ as a function of temperature with channel inputs of carbon and oxygen when the ratio of carbon to oxygen at the input is 1:1. The plot at 710 shows that with this 1:1 ration of carbon:oxygen, the output is $CO_2$ with no CO being generated. Thus, to generate only CO in the partial oxidation process of Equation 2, the temperature should be above 1200 C and the flow of $O_2$ limited to a carbon:oxygen ratio of 2:1. $CO_2$, will be produced if $O_2$ increased to a carbon:oxygen ratio of 1:1.

Figure 8:
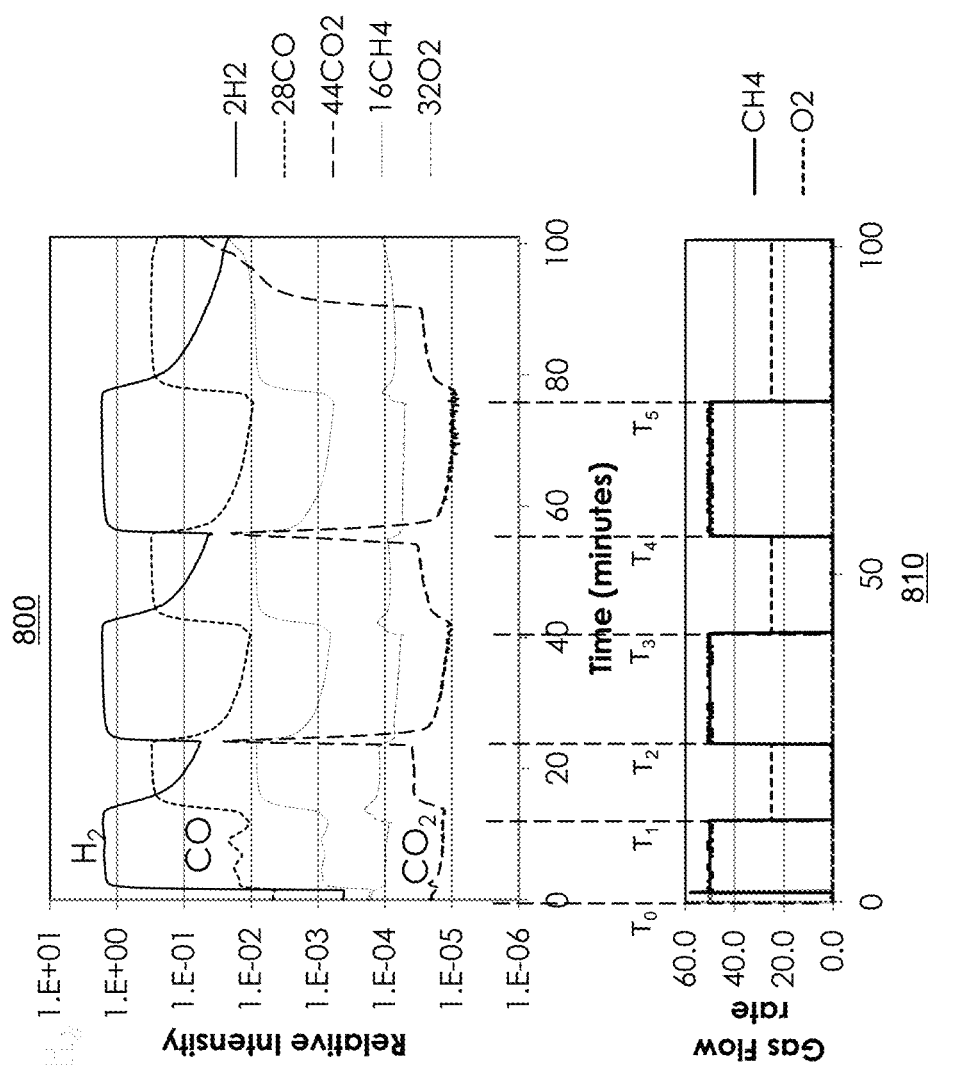
FIG. 8 depicts an example plot of relative gas intensity as a function of time for an example system.

FIG. 8 depicts an example plot of relative gas intensity as a function of time for an example system. In the example of FIG. 8, a little after T=0, a flow of methane into a channel reactor is started. After methane begins to flow, pyrolysis starts thereby generating hydrogen and carbon that attaches to the channel walls. From the plot at 800, hydrogen generation can be seen. At this time, very little CO or $CO_2$ is produced because there is no oxygen present. At $T_1$, the methane flow is stopped and oxygen begins to flow. As oxygen flows CO begins to be produced after $T_1$ as shown at 800 and the hydrogen generation tapers off. At $T_2$ the oxygen flow is stopped and the methane flow started again. After $T_2$, hydrogen production starts again and CO production tapers off. The cycle repeats. As described with respect to FIG. 7, CO production can be favored over $CO_2$ by limiting the oxygen flow. If the carbon availability is limited, $CO_2$ will be produced. To match the cycle, the ratio of flow rate of methane:oxygen is 2:1.

When oxygen flows into the reactor at certain times, such as between $T_1$ to $T_2$ and $T_3$ to $T_4$, sufficient carbon can be deposited on the wall to keep the ratio of C:O at or greater than 1, and the CO production will dominate at high temperatures with only a trace of $CO_2$.

In the first two cycles which are $T_0$ to $T_2$ and $T_2$ to $T_4$, when the oxygen flow is close to the end of the cycle, most of the carbon is already burned and the small amount of carbon left is not enough to hold the ratio of C:O to be at or greater than 1, thus resulting in $CO_2$ being produced. The $CO_2$ production occurs for a short time and after the cycle has ended, the gas flow switches to methane. At the end of the cycle, some carbon is probably still present but there is no oxygen to form $CO_2$. This is why the $CO_2$ production tends to be brief in time within a cycle and looks like a sharp spike in FIG. 8. High methane flow which is twice the $O_2$ flow also produces $CO_2$ quickly reaching the gas measuring point, which also contribute high $CO_2$ concentration within short time.

For the third cycle which begins at $T_4$, not all the carbon produced from methane decomposition is coated on the channel walls and some of the carbon flows out with hydrogen as dust resulting in CO2 that is produced far from the cycle end.

For pure CO production, the $O_2$ flow should be stopped before CO2 is produced.

Figure 9:
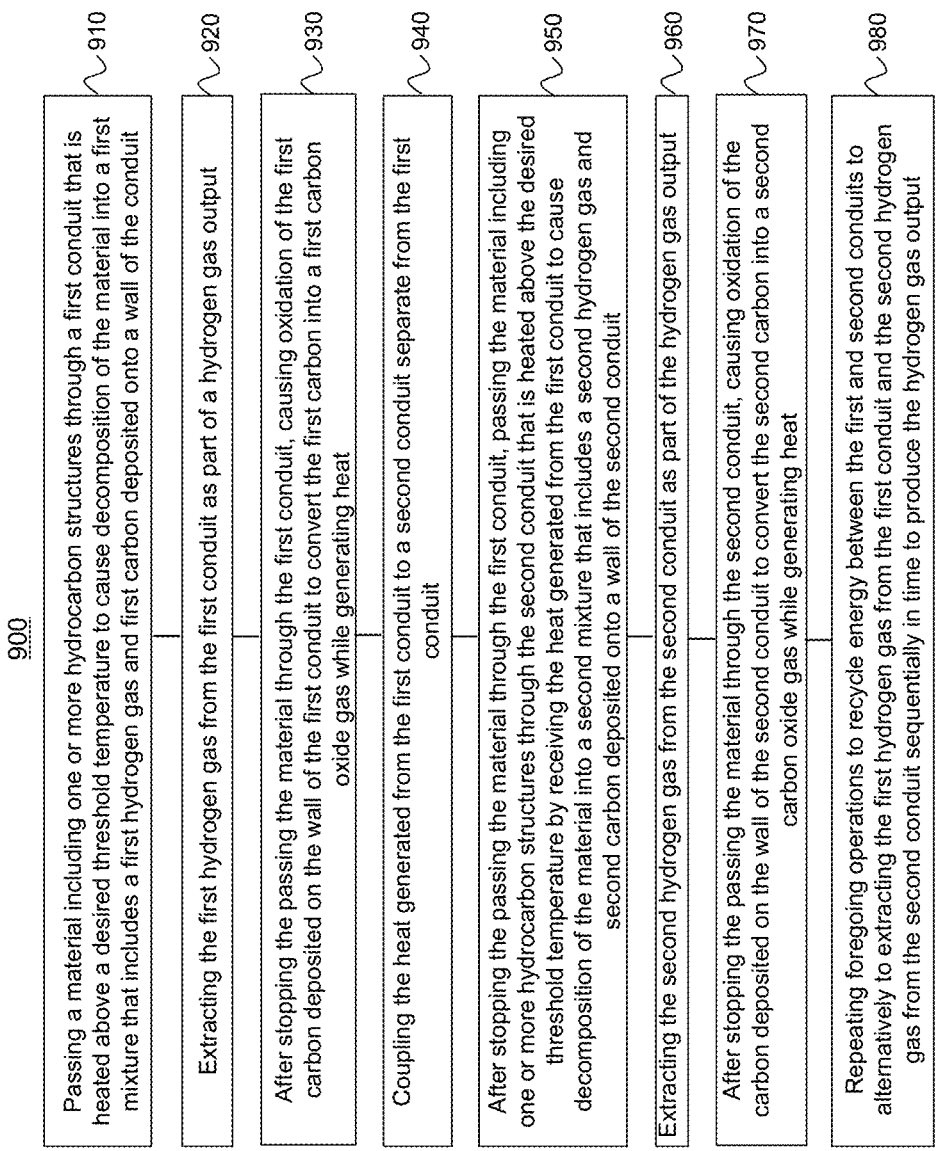
FIG. 9 depicts a method of generating hydrogen gas, in accordance with some example embodiments.

FIG. 9 depicts a method of generating hydrogen gas, in accordance with some example embodiments. At 910, the method includes passing a material including one or more hydrocarbon structures through a first conduit that is heated above a desired threshold temperature to cause decomposition of the material into a first mixture that includes a first hydrogen gas and first carbon deposited onto a wall of the conduit. At 920, the method includes extracting the first hydrogen gas from the first conduit as part of a hydrogen gas output. At 930, the method includes after stopping the passing the material through the first conduit, causing oxidation of the first carbon deposited on the wall of the first conduit to convert the first carbon into a first carbon oxide gas while generating heat. At 940, the method includes coupling the heat generated from the first conduit to a second conduit separate from the first conduit. At 950, the method includes after stopping the passing the material through the first conduit, passing the material including one or more hydrocarbon structures through the second conduit that is heated above the desired threshold temperature by receiving the heat generated from the first conduit to cause decomposition of the material into a second mixture that includes a second hydrogen gas and second carbon deposited onto a wall of the second conduit. At 960, the method includes extracting the second hydrogen gas from the second conduit as part of the hydrogen gas output. At 970, the method includes after stopping the passing the material through the second conduit, causing oxidation of the carbon deposited on the wall of the second conduit to convert the second carbon into a second carbon oxide gas while generating heat. At 980, the method includes repeating foregoing operations to recycle energy between the first and second conduits to alternatively to extracting the first hydrogen gas from the first conduit and the second hydrogen gas from the second conduit sequentially in time to produce the hydrogen gas output.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various components in the embodiments described in this patent document should not be understood as requiring such separation in all embodiments.

Only a few implementations and examples are described, and other implementations enhancements and variations can be made based on what is described and illustrated in this patent document.

What is claimed is:

1. A method of generating hydrogen gas by recycling energy, comprising:
passing a material including one or more hydrocarbon structures through a first conduit that is heated above a desired threshold temperature to cause decomposition of the material into a first mixture that includes a first hydrogen gas and first carbon deposited onto a wall of the conduit;
extracting the first hydrogen gas from the first conduit as part of a hydrogen gas output;
after stopping the passing the material through the first conduit, causing oxidation of the first carbon deposited on the wall of the first conduit to convert the first carbon into a first carbon oxide gas while generating heat;
coupling the heat generated from the first conduit to a second conduit separate from the first conduit;
after stopping the passing the material through the first conduit, passing the material including one or more hydrocarbon structures through the second conduit that is heated above the desired threshold temperature by receiving the heat generated from the first conduit to cause decomposition of the material into a second mixture that includes a second hydrogen gas and second carbon deposited onto a wall of the second conduit;
extracting the second hydrogen gas from the second conduit as part of the hydrogen gas output;
after stopping the passing the material through the second conduit, causing oxidation of the carbon deposited on the wall of the second conduit to convert the second carbon into a second carbon oxide gas while generating heat; and
repeating foregoing operations to recycle energy between the first and second conduits to alternatively extract the first hydrogen gas from the first conduit and the second hydrogen gas from the second conduit sequentially in time to produce the hydrogen gas output.

2. The method of claim 1, further comprising extracting the first carbon oxide gas from the first conduit and the second carbon oxide gas from the second to produce a carbon oxide gas output.

3. The method of claim 2, further comprising controlling the oxidation in the first and second conduits to render the first and second carbon oxide gases as carbon monoxide.

4. The method of claim 2, further comprising controlling the oxidation in the first and second conduits to render the first and second carbon oxide gases as carbon dioxide.

5. The method of claim 1, wherein the material includes methane.

6. The method of claim 1, wherein the material includes a fluid that includes diesel, gasoline, or kerosene.

7. The method of claim 1, wherein the material includes JP8.

8. The method of claim 1, wherein the material includes methane, and wherein the step of causing decomposition of the material is controlled so that the decomposition in the first and second conduit occurs in accordance with the endothermic chemical equation:

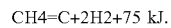

9. The method of claim 1, wherein the oxidation is controlled to be:

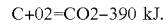

10. The method of claim 1, wherein the oxidation is controlled to be:

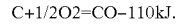

11. The method of claim 1, wherein the material includes natural gas, propane, ethane, butane, or another hydrocarbon gas.

12. The method of claim 1, wherein the recycling energy between the first and second conduits is a self-sustaining cycle not requiring external heat.

* * * * *